No. 696,788. Patented Apr. 1, 1902.
C. C. ALLEN.
OPTICAL OBJECTIVE.
(Application filed Feb. 25, 1901.)

(No Model.) 2 Sheets—Sheet 1.

Witnesses:
Chas. E. Gaylord,
John Enders Jr.

Inventor:
Clile C. Allen,
By Banning & Banning,
Attys.

No. 696,788. Patented Apr. 1, 1902.
C. C. ALLEN.
OPTICAL OBJECTIVE.
(Application filed Feb. 25, 1901.)

(No Model.) 2 Sheets—Sheet 2.

Witnesses: Inventor:
Clile C. Allen,
By Banning & Banning,
Att'ys.

UNITED STATES PATENT OFFICE.

CLILE C. ALLEN, OF CHICAGO, ILLINOIS.

OPTICAL OBJECTIVE.

SPECIFICATION forming part of Letters Patent No. 696,788, dated April 1, 1902.

Application filed February 25, 1901. Serial No. 48,726. (No model.)

*To all whom it may concern:*

Be it known that I, CLILE C. ALLEN, a citizen of the United States, residing at Chicago, in the county of Cook and State of Illinois, have invented certain new and useful Improvements in Optical Objectives, of which the following is a specification.

This invention relates to objectives for use in optical instruments, and more especially in connection with stereopticons and similar apparatus.

The object of the invention is to improve the arrangement and construction of the lenses which enter as elements into an objective by providing means whereby the focal length of the lens system may be varied without the removal or substitution of some part of the lens system, and to provide, further, that the image formed by the objective shall remain at a fixed distance with reference to the objective for all variations of the focal length; and the invention consists in an objective or lens system composed of three lens elements, the first and third of which are permanently fixed i. the front and rear end of the lens-tube, respectively, while the second is movable and capable of being placed in any intermediate position between the first and third elements; and the invention further consists in the features of construction and combinations of parts hereinafter described and claimed.

Figure 1:
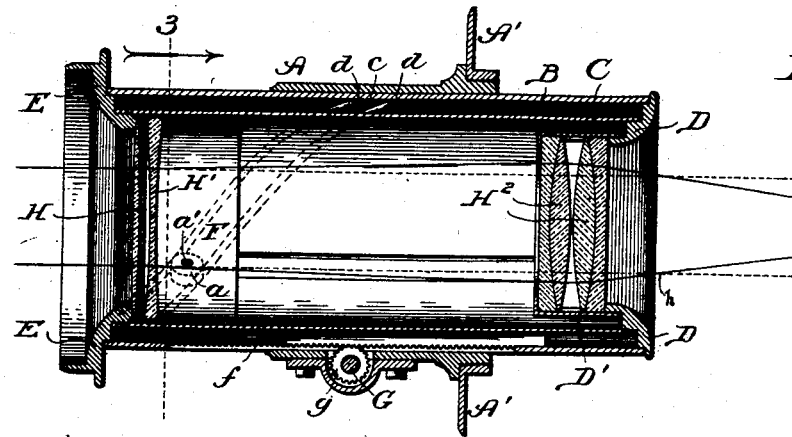
Figure 2:
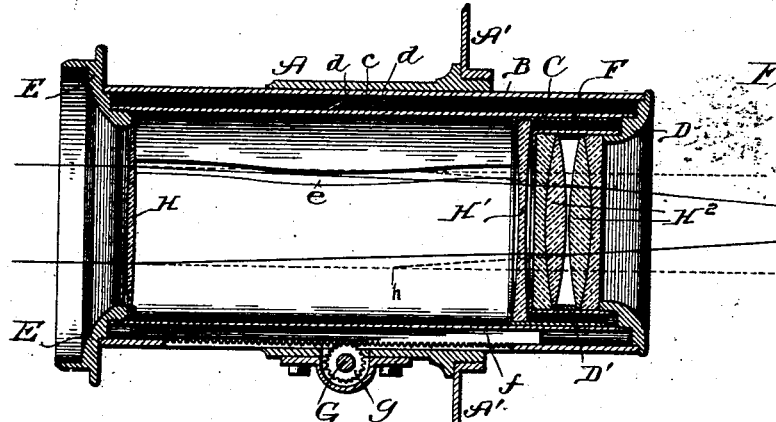
Figure 3:
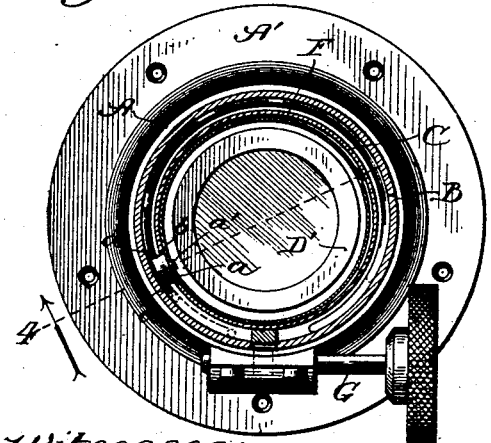
Figure 4:
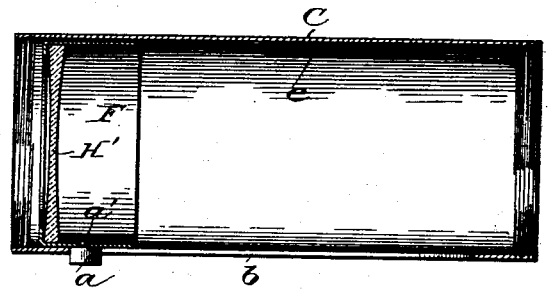

In the accompanying drawings, Figure 1 is a central longitudinal section showing a construction of lens-tube and an arrangement of the elements constituting the objective by which a display will be made of the minimum magnitude of the image. Fig. 2 is a similar view to Fig. 1, showing the position of the elements by which a display will be made of the maximum magnitude of the image; Fig. 3, a cross-section on line 3 of Fig. 1; Fig. 4, a central longitudinal section of the inner carrying-tube and the sliding sleeve or cell carrying the intermediate element; Figs. 5, 6, 7, and 8, outline views showing arrangements of the elements on different plans from that shown in Fig. 1, but involving the same principle and producing the same result.

In the drawings, Figs. 1, 2, 3, and 4 show a construction of lens-tube adapted to carry the elements in their relative relation to each other for attaining the end sought. The lens-tube, as shown, consists of an outer band or support A, screw-threaded onto which is a plate A' for attachment of the tube as a whole to a lantern or other appliance where the tube, with the elements of the invention located, arranged, and operating therein, is to be used. An outer tube B slides in the band or support A, and an inner tube C, movable with the outer tube, is arranged therein, as usual. A lens cell or holder D is screw-threaded into the end of the inner tube, and a lens cell or holder E is screw-threaded into the end of the inner tube at the opposite end thereof to the lens-holder D. The lens cells or holders carry the fixed elements constituting part of the invention. A sliding cell or support F is located and slides within the interior tube C, and this cell or support carries the movable element which enters into the invention. The cell or support F has on its exterior a roller $a$, carried by a stud or pin $a'$, and this roller projects through a straight longitudinal slot $b$ in the body of the tube C and enters a spiral guideway or track $c$, between two guide strips or rails $d$, located on the inner face of and extending spirally from end to end of the tube B, so that by turning or revolving the inner tube the roller will travel in the track or guideway therefor and advance and recede the cell or support F to locate the element carried thereby adjacent to the elements carried by the lens cells or supports D and E, according as to which end of the lens-tube the cell or support is adjusted. The lens-tube as a whole—that is, the outer and inner tubes B and C and the parts carried thereby—is movable in the band or support A by a spindle G, carrying a pinion $g$, which meshes with a rack $f$ on the tubes, as shown in Figs. 1, 2, and 3, so that by turning the spindle in one direction or the other the lens-tube as a whole will be moved forward and back in its band or support. The holder or cell F is held in a direct line of travel and maintained in a parallelism of travel by a spring $e$, which forces the opposite side snugly against the interior tube, thereby preventing any end tipping or tilting of the holder or cell in its travel forward and back within the interior tube.

The front element H is carried by the end cell or ring E, the intermediate adjustable element H' is carried by the sliding holder or cell F, and the rear element H² is carried by the cell or ring D by means of a band D', screw-threaded onto the cell or ring and having secured therein the element, as shown in Figs. 1 and 2, and it will be seen that by turning the tube C in one direction the intermediate element will be carried so as to be in juxtarelation to the front element, as shown in Fig. 1, and by turning the tube C in the other direction the intermediate element will be carried into a juxta relation or position to the element H², as shown in Fig. 2, and these two points of adjustment give the extremes of display from the maximum to the minimum, and an adjustment between these two points gives a display intermediate of the maximum and minimum points.

The preferred form of the system is shown in Fig. 1 and Fig. 2. The front element H is of the positive or converging type and is of comparatively long focal length. The element H' is of the negative or diverging type, being approximately half the focal length of the element H, the rear element H² being of the positive type and of approximately half the focal length of the element H', the distance between the elements H and H² being approximately equal to the focal length of the element H². The elements H and H' are constructed of crown-glass of the refractive index of 1.52 and having the same dispersion, while the element H² is constructed of two nearly plano-convex cemented doublets, each being composed of a biconvex-crown lens having a refractive index of 1.52, cemented to a nearly plano-concave flint lens having a refractive index of 1.62, the radii of curvature of the cemented or contact surface being so proportioned as to slightly undercorrect the element as a whole in order to properly compensate for the negative aberration of the elements H and H' when these elements are placed in juxtaposition one to the other at the front end of the lens-tube, as shown in Fig. 1. The positive aberration of the element H² is not great enough, however, to counteract the negative aberration of the element H', so that when the elements H' and H² are placed in juxtaposition one to the other, as shown in Fig. 2, their combined aberration is negative and of sufficient amount to properly counteract the positive aberration of the element H.

When the element H' is placed in juxtaposition to the element H, as shown in Fig. 1, it will be seen that the point of emergence of the entire system (designated by $h$) lies between the element H² and the plane of the image, (designated by O.) When, however, the element H' is moved along the optic axis by means of the mechanism described or other suitable means to the position shown in Fig. 2, it will be seen that the sum of the focal lengths of the elements H' and H² will be approximately twice the focal length of the element H², thereby lengthening the equivalent focus of the entire system, and that the point of emergence in this instance will be situated between the two outer elements H and H², the difference between the position of the point $h$ as shown in Fig. 1 and its position as shown in Fig. 2 being equal to the variation of the focal length of the entire system. By so constructing the system that the negative element shall be of shorter focal length than either of the elements H and H² it will be seen that when the element H' is in juxtaposition to the element H the point of emergence will be behind the element H², and when the elements H' and H² are in juxtaposition the point of emergence will be in front of the element H, thus making possible a greater variation of the equivalent focal length of the system.

Figure 5:
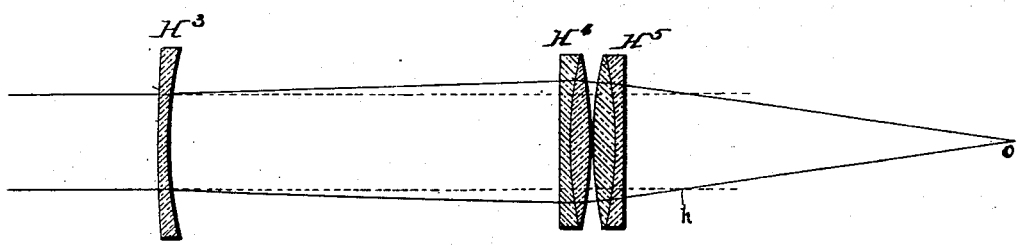
Figure 6:
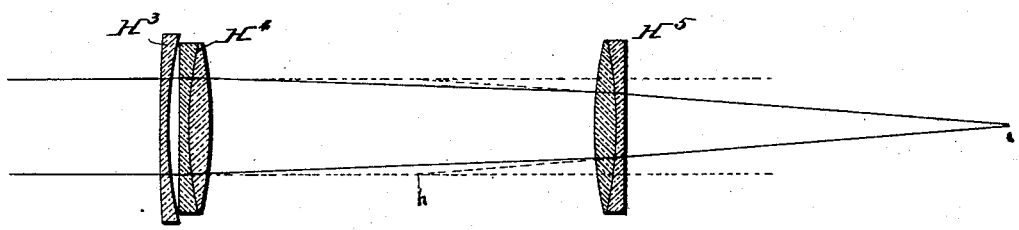
Figure 7:
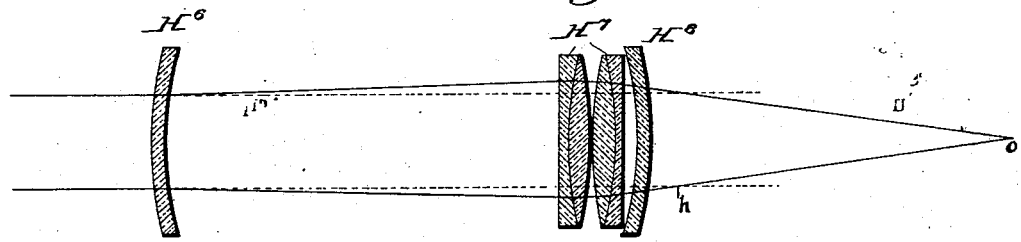
Figure 8:
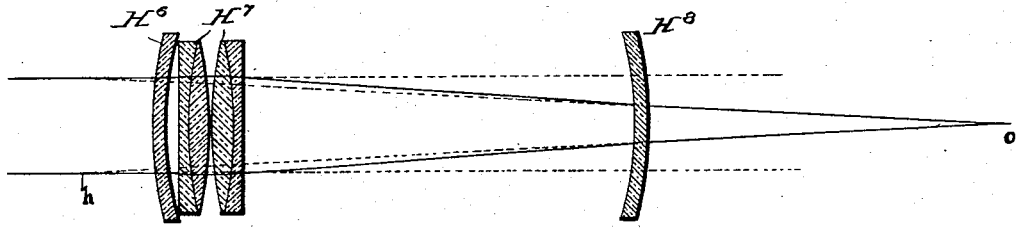

In practice I prefer to use the form of lens system shown in Figs. 1 and 2. It is obvious, however, that the system may be transposed or differently arranged without the introduction of any new features. As an example, Fig. 5 and Fig. 6 show an arrangement for the minimum and maximum focal length, respectively, of the same system as in Figs. 1 and 2 transposed, the element H³ being equal to the sum of the focal lengths of the elements H and H' of Figs. 1 and 2, the element H⁴ being equal as regards focal length to the element H' of Figs. 1 and 2, but of the positive or converging type, while the element H⁵ is equal to the sum of the focal lengths of the elements H' and H². Fig. 7 and Fig. 8 show another arrangement of the form shown in Figs. 1 and 2 when the element H' in Figs. 1 and 2 is of shorter focal length than either of the elements H or H². The element H⁶ is equal to the sum of the focal lengths of the elements H and H' of Figs. 1 and 2. The element H⁷ is equal as regards focal length to the element H', but is positive, the element H⁸ being equal to the sum of the focal length of the elements H' and H². In the drawings the elements H, H', H³, H⁶, and H⁸ are shown as single lenses. I do not desire to limit myself to this form, however, as it is obvious that each element may be composed of more than one lens. It will be seen that in order to vary the magnitude of the image it will not be necessary to remove part or all of an objective, substituting therefor another part or objective having a different focal length, as is now the practice, as all that is necessary to be done with my invention is to move the central or intermediate element to the proper position between the two outer elements of the system to produce any magnitude desired, from the smallest or minimum to the greatest or maximum magnitude.

As the center element is moved in one direction or the other it will be seen that its effects as regards each end element is different. For instance, in Figs. 1 and 2, when the element H' is moved from the position shown in Fig. 1 to the position shown in Fig. 2, its effect upon the element $H^2$ is much more pronounced than its effect on the element H, as or for the reason that the element H is only slightly converging, while the element $H^2$ is strongly converging, and it is obvious that the principal effect of its movement will be effective or act upon the element $H^2$ rather than on the element H, the effect of a diverging lens or element in counteracting the converging power of a converging lens or element being greater when the two are in contact and decreasing as their separation is increased.

Having thus described my invention, what I claim as new, and desire to secure by Letters Patent, is—

An optical objective consisting of two fixed outer lens elements, a movable intermediate lens element adapted to be adjusted in varying intermediate positions between the two outer lens elements, and means for adjusting the intermediate lens element, substantially as described.

CLILE C. ALLEN.

Witnesses:
SAMUEL W. BANNING,
THOMAS B. MCGREGOR.